US012600424B2

(12) United States Patent
Kenagy et al.

(10) Patent No.: US 12,600,424 B2
(45) Date of Patent: Apr. 14, 2026

(54) CONVERTIBLE CARGO HOLDER AND BICYCLE SEAT

(71) Applicant: The Radio Flyer Company, Chicago, IL (US)

(72) Inventors: Kyle Kenagy, Chicago, IL (US); Anne Goodman, Chicago, IL (US)

(73) Assignee: The Radio Flyer Company, Chicago, IL (US)

( * ) Notice: Subject to any disclaimer, the term of this patent is extended or adjusted under 35 U.S.C. 154(b) by 133 days.

(21) Appl. No.: 18/446,128

(22) Filed: Aug. 8, 2023

(65) Prior Publication Data

US 2024/0051632 A1     Feb. 15, 2024

Related U.S. Application Data

(60) Provisional application No. 63/396,291, filed on Aug. 9, 2022.

(51) Int. Cl.
    *B62J 7/04*         (2006.01)
    *B62J 1/00*         (2006.01)

(52) U.S. Cl.
    CPC .. *B62J 7/04* (2013.01); *B62J 1/00* (2013.01)

(58) Field of Classification Search
    CPC ......... B62J 9/24; B62J 9/23; B62J 9/27; B62J 9/21; B62J 1/16; B62J 1/12; B62J 7/04
    USPC ....... 224/418, 419, 430–435, 438, 463, 415; 280/202, 9.4
    See application file for complete search history.

(56) References Cited

U.S. PATENT DOCUMENTS

| | | | | |
|---|---|---|---|---|
| 3,396,885 A | * | 8/1968 | Giondi ...................... | B62J 9/23 |
| | | | | 224/438 |
| 4,085,968 A | * | 4/1978 | Svensson ................. | B62J 11/00 |
| | | | | 224/415 |
| 11,975,786 B2 | * | 5/2024 | Goodman .............. | B62K 27/02 |

FOREIGN PATENT DOCUMENTS

| | | |
|---|---|---|
| CN | 216070292 U | 3/2022 |
| JP | 2021112450 A | 8/2021 |

OTHER PUBLICATIONS

International Preliminary Report on Patentability and Written Opinion for PCT/US2023/071857 dated Nov. 16, 2023 (9 pages).

* cited by examiner

*Primary Examiner* — Corey N Skurdal
(74) *Attorney, Agent, or Firm* — Barnes & Thornburg LLP

(57) ABSTRACT

A convertible cargo holder that is secured to a bicycle and that converts to a seat, such as for a child. The convertible cargo holder has a frame that is secured to the bicycle. The frame has a top hoop. A cargo liner is secured to the hoop, and a pouch is secured to the cargo liner. The cargo liner can be disconnected from the hoop and inserted into the pouch. A seat removably engages the frame to support the rider when the cargo liner is removed.

19 Claims, 10 Drawing Sheets

*FIG. 5*
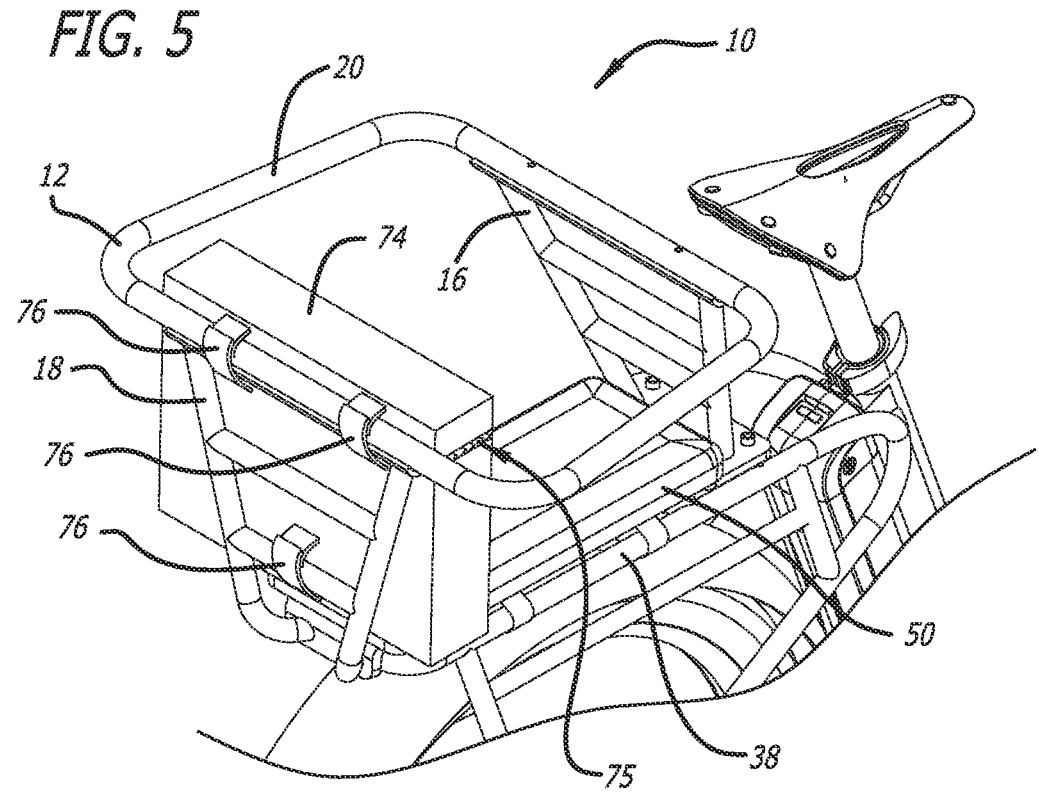
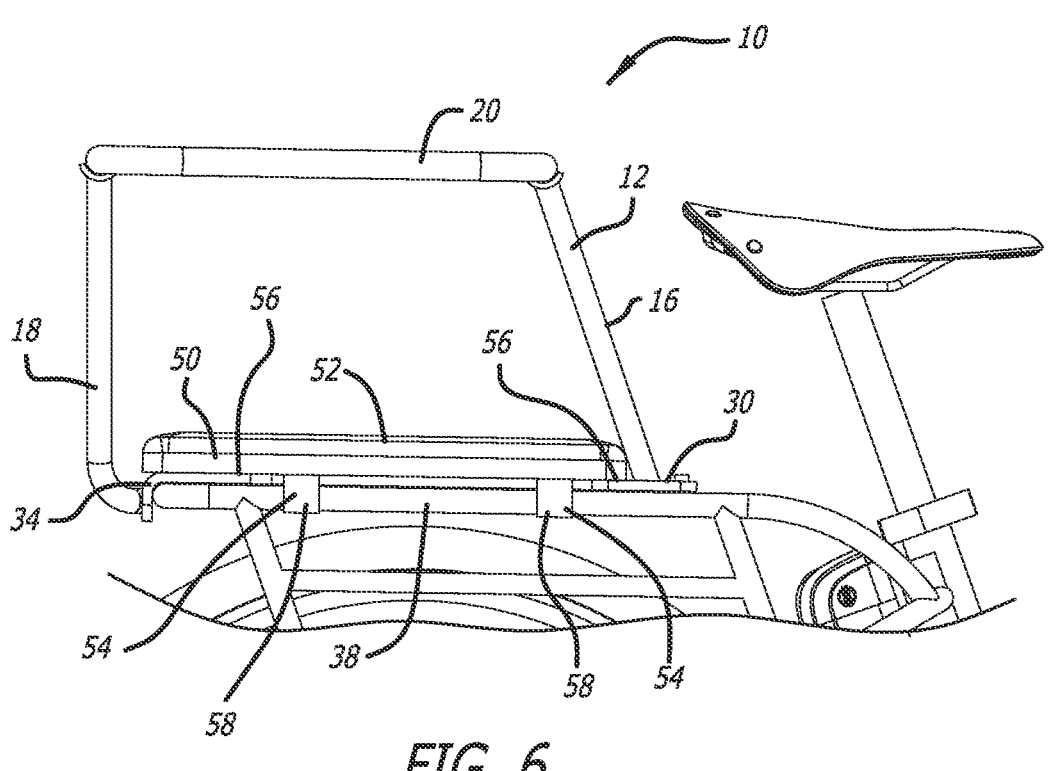
*FIG. 6*

CONVERTIBLE CARGO HOLDER AND BICYCLE SEAT

CROSS-REFERENCE TO RELATED APPLICATIONS PATENT

This application claims the benefit of U.S. Provisional Patent Application No. 63/396,291 filed Aug. 9, 2022, which is expressly incorporated herein by reference and made a part hereof.

FEDERALLY SPONSORED RESEARCH OR DEVELOPMENT

Not Applicable.

TECHNICAL FIELD

The present subject matter relates to cargo holders, and more particularly, to cargo holders that converts to a child seat for a bicycle.

BACKGROUND

Child seats and bicycle cargo holders are known in the art. While such assemblies according to the prior art provide a number of advantages, they nevertheless have certain limitations. The present disclosure seeks to overcome certain of those limitations and other drawbacks of the prior art, and to provide new features not heretofore available. A full discussion of the features and advantages of the present disclosure is deferred to the following detailed description, which proceeds with reference to the accompanying drawings.

SUMMARY

According to certain aspects of the present disclosure, the disclosed subject technology relates to a convertible cargo holder and bicycle seat assembly that is secured to a bicycle.

The disclosed technology further relates to a convertible cargo holder that is secured to a bicycle, comprising: a frame having a first frame assembly, a second frame assembly and a hoop, wherein the first frame assembly has a first receiver at a first end and a first bracket at a second end, wherein the second frame assembly has a second receiver at a first end and a second bracket at a second end, wherein the hoop is secured to the first receiver of the first frame assembly and the second receiver of the second frame assembly, and wherein the first bracket of the first frame assembly is secured to the bicycle and the second bracket of the second frame assembly is secured to the bicycle to secure the frame to the bicycle; a seat having a first end and a second end, wherein the seat is removably secured to one of the frame and the bicycle, and wherein when the seat is secured to one of the frame and the bicycle the first end of the seat engages the first frame assembly and the second end of the seat engages the second frame assembly; a cargo liner having a front wall, a rear wall, opposing side walls joining the front wall and the rear wall, and a bottom wall secured to the front wall, rear wall and opposing sidewalls to form a cavity, the cargo liner being secured to the hoop; and, a pouch secured to one of the front wall, rear wall, opposing side walls, and bottom wall of the cargo liner, the pouch having a receptacle, wherein the cargo liner can be disconnected from the hoop and inserted into the receptacle of the pouch, wherein the pouch has securing members, and wherein the pouch with the cargo liner therein can be secured to the frame with the securing members and operate as a backrest.

The disclosed technology further relates to a convertible cargo holder that is secured to a bicycle, comprising: a frame secured to the bicycle, the frame having a hoop; a cargo liner having a front wall, a rear wall, opposing side walls joining the front wall and the rear wall, and a bottom wall secured to the front wall, rear wall and opposing sidewalls to form a cavity, the cargo liner being secured to the hoop; and, a pouch secured to one of the front wall, rear wall, opposing side walls, and bottom wall of the cargo liner, the pouch having a receptacle, wherein the cargo liner can be disconnected from the hoop and inserted into the receptacle of the pouch, wherein the pouch has securing members, and wherein the pouch with the cargo liner therein can be secured to the frame with the securing members and operate as a backrest.

The disclosed technology further relates to a convertible cargo holder that is secured to a bicycle, comprising: a frame secured to the bicycle, the frame having a hoop; a seat removably engaging the frame; a cargo liner secured to the hoop; and, a pouch secured to the cargo liner, wherein the cargo liner can be disconnected from the hoop and inserted into the pouch.

The disclosed technology further relates to a convertible cargo holder, wherein the pouch is inverted to create the receptacle.

The disclosed technology further relates to a convertible cargo holder, wherein the securing members are provided outside the receptacle when the cargo liner is located within the receptacle.

The disclosed technology further relates to a convertible cargo holder, wherein the seat has a securing device to removably secure the seat to one of the frame and the bicycle.

The disclosed technology further relates to a convertible cargo holder, wherein the hoop has a front member, a rear member, and two side members.

The disclosed technology further relates to a convertible cargo holder, wherein the front member of the hoop is secured to the first receiver of the first frame assembly, and wherein the rear member of the hoop is secured to the second receiver of the second frame assembly.

The disclosed technology further relates to a convertible cargo holder, wherein the cargo liner is soft-sided and made of a fabric material.

The disclosed technology further relates to a convertible cargo holder, wherein the cargo liner has fasteners adjacent the front wall, rear wall and opposing sidewalls thereof, to secure the cargo liner to the hoop.

The disclosed technology further relates to a convertible cargo holder, wherein the second bracket of the second frame assembly has a planar portion and a flange portion that extends downwardly therefrom to operate as a stop.

The disclosed technology further relates to a convertible cargo holder, further comprising a secondary planar portion extending from the flange portion, the secondary planar portion being substantially parallel with the planar portion.

The disclosed technology further relates to a convertible cargo holder, wherein the second frame assembly has a second end member that joins the second receiver and the second bracket, and wherein the first frame assembly has a first end member that joins the first receiver and the first bracket, the first end member being at a transverse angle to the hoop.

The disclosed technology further relates to a convertible cargo holder, further comprising a seat having a first end and a second end, wherein the seat is removably secured to one of the frame and the bicycle, and wherein when the seat is secured to one of the frame and the bicycle the seat engages the frame.

The disclosed technology further relates to a convertible cargo holder, wherein the cargo liner is secured to the hoop adjacent the front wall, rear wall and opposing sidewalls thereof.

The disclosed technology further relates to a convertible cargo holder, wherein the frame also has a first frame assembly and a second frame assembly, wherein the first frame assembly has a first receiver at a first end and a first bracket at a second end, wherein the second frame assembly has a second receiver at a first end and a second bracket at a second end, wherein the hoop is secured to the first receiver of the first frame assembly and the second receiver of the second frame assembly, and wherein the first bracket of the first frame assembly is secured to the bicycle and the second bracket of the second frame assembly is secured to the bicycle to secure the frame to the bicycle.

The disclosed technology further relates to a convertible cargo holder, wherein the cargo liner has a front wall, a rear wall, opposing side walls joining the front wall and the rear wall, and a bottom wall secured to the front wall, rear wall and opposing sidewalls to form a cavity.

The disclosed technology further relates to a convertible cargo holder wherein the pouch is secured to one of the front wall, rear wall, opposing side walls, and bottom wall of the cargo liner, the pouch having a receptacle, wherein the cargo liner can be disconnected from the hoop and inserted into the receptacle of the pouch, wherein the pouch has securing members, and wherein the pouch with the cargo liner therein can be secured to the frame with the securing members and operate as a backrest.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below are incorporated in and constitute a part of this specification, and serve to explain the principles of the disclosure. In the drawings:

FIG. 5 is a rear perspective view of the cargo holder of FIG. 4, according to the present disclosure.

FIG. 6 is a partial side elevation view of the cargo holder of FIG. 1, according to the present disclosure.

Figure 1:
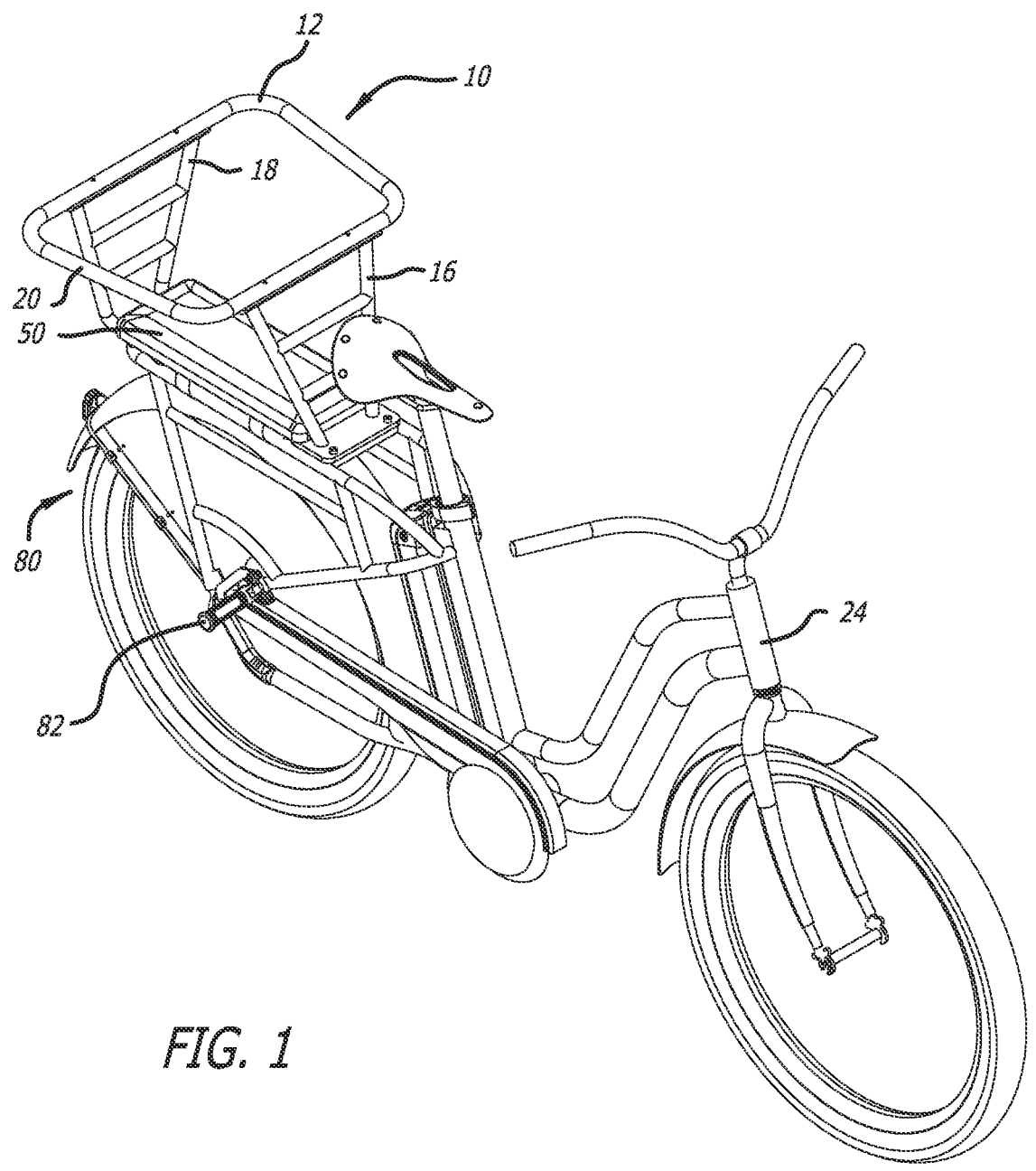
FIG. 1 is a perspective view of a cargo holder according to the present disclosure, shown in its environment of use in a first mode.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law.

Figure 2:
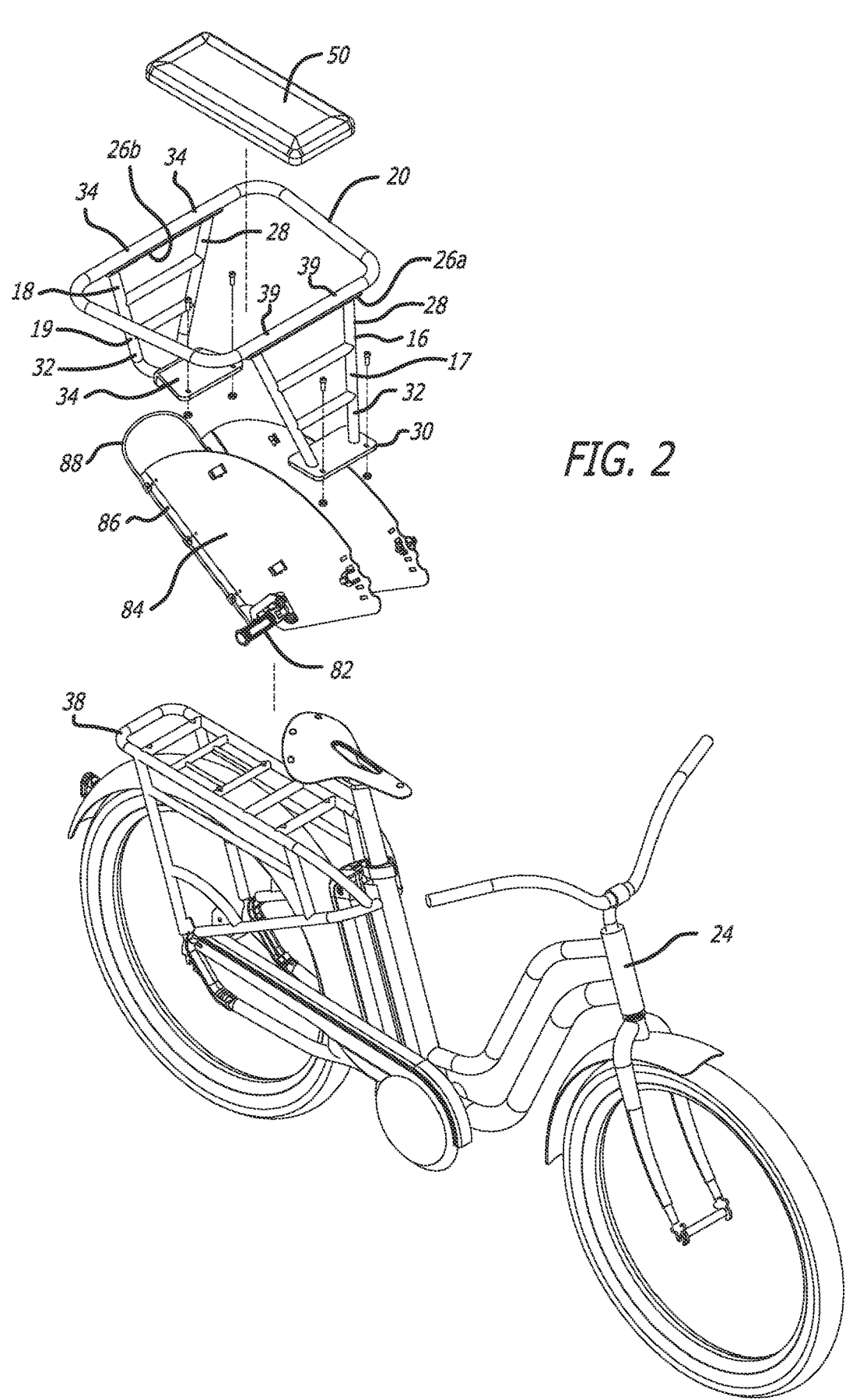
FIG. 2 is an exploded perspective view of the cargo holder of FIG. 1, according to the present disclosure.
Figure 3:
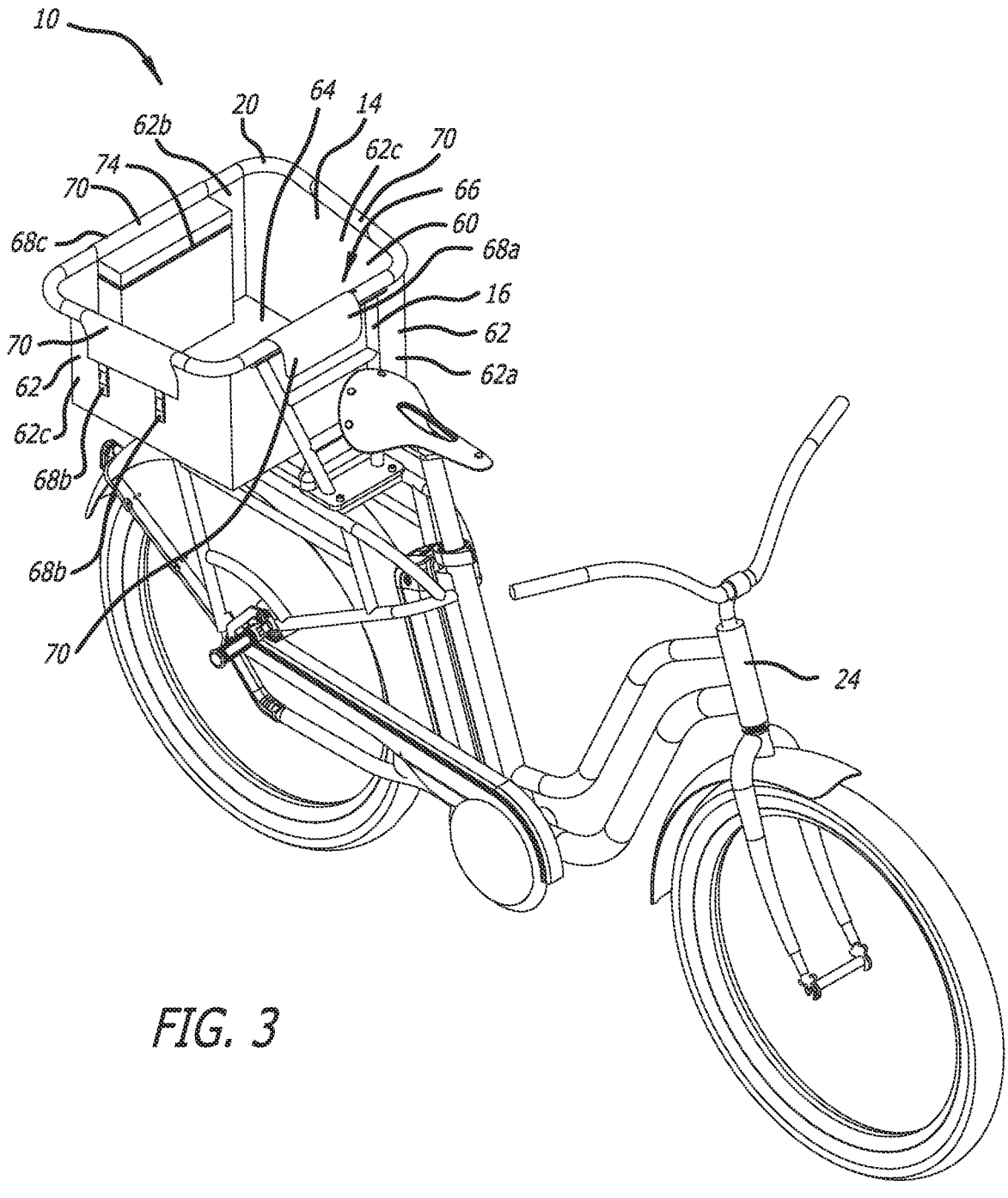
FIG. 3 is a perspective view of a cargo holder according to the present disclosure, shown in its environment of use in a second mode.
Figure 4:
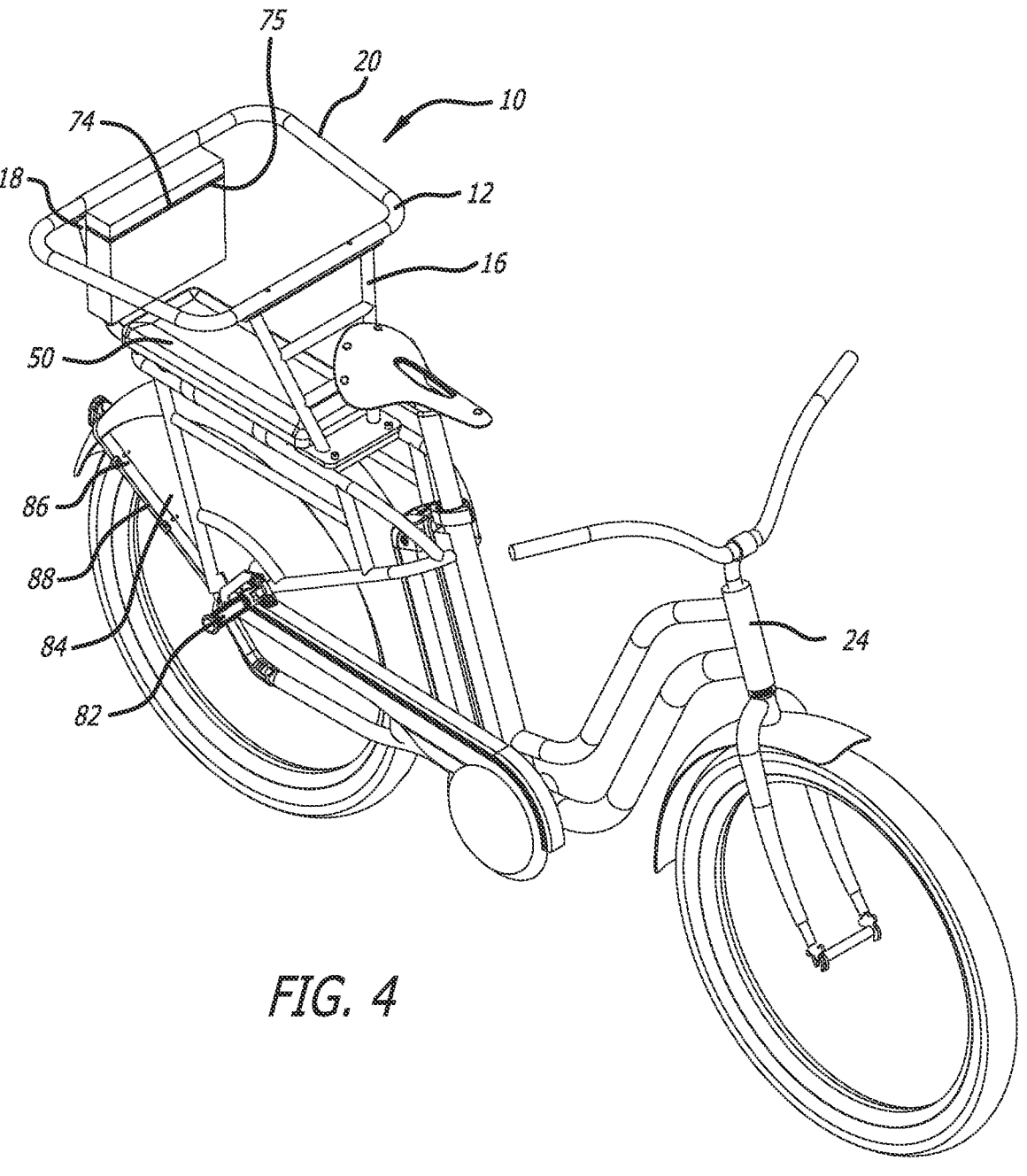
FIG. 4 is a perspective view of the cargo holder of FIG. 1, with the liner removed.

Generally, this disclosure describes several embodiments of cargo holders 10 that are arrangeable in a variety of different orientations. Typically, as shown in FIGS. 1-3, the cargo holder 10 is utilized with bicycles, including e-bikes, and is connected to the frame of the bicycle. The cargo holder 10 is generally operable in at least two modes, a storage mode as shown in FIG. 3, and a kid transport mode as shown in FIGS. 1 and 4, and can accept a variety of accessories. Additionally, alternate cargo holders, such as a cooler, etc. can be inserted into the cargo frame 12 for transport.

Referring now to the figures, and initially to FIGS. 1-4, there is shown an embodiment of a cargo holder 10 for carrying cargo or a rider, such as a child. In one embodiment, as shown in FIG. 3, the cargo holder 10 generally comprises a frame 12 and a cargo liner 14. And, in one embodiment the frame 12 comprises a first frame assembly 16, a second frame assembly 18, and a hoop 20. In one embodiment, the cargo holder 10 is secured to a bicycle 24 behind the bicycle seat.

In one embodiment, the first frame assembly 16 has a first receiver 26a at a first end 28 thereof, and a first bracket 30 as a second end 32 thereof. The first frame assembly 16 may also have a first end member 17 that joins the first receiver 26a and the first bracket 30. Similarly, in one embodiment, the second frame assembly 18 has a second receiver 26b at a first end 28 thereof, and a second bracket 34 at a second end 32 thereof. The second frame assembly 18 may also have a second end member 19 that joins the second receiver 26b and the second bracket 34. In one embodiment, the hoop 20 is secured to the first receiver 26a of the first frame assembly 16 and the second receiver 26b of the second frame assembly 18.

Figure 10:
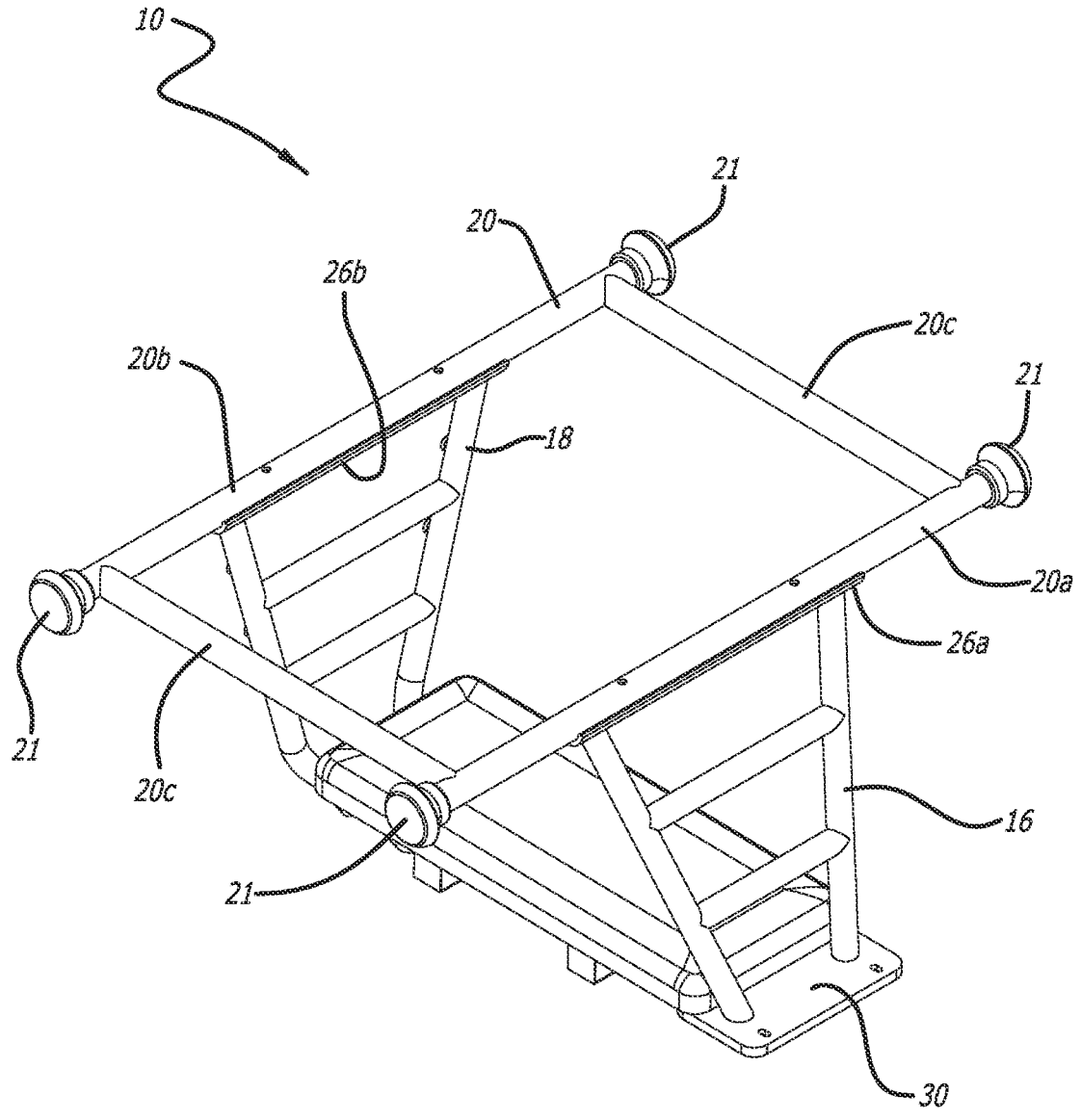
FIG. 10 is a top perspective view of another embodiment of a cargo holder for a bicycle, according to the present disclosure.
Figure 11:
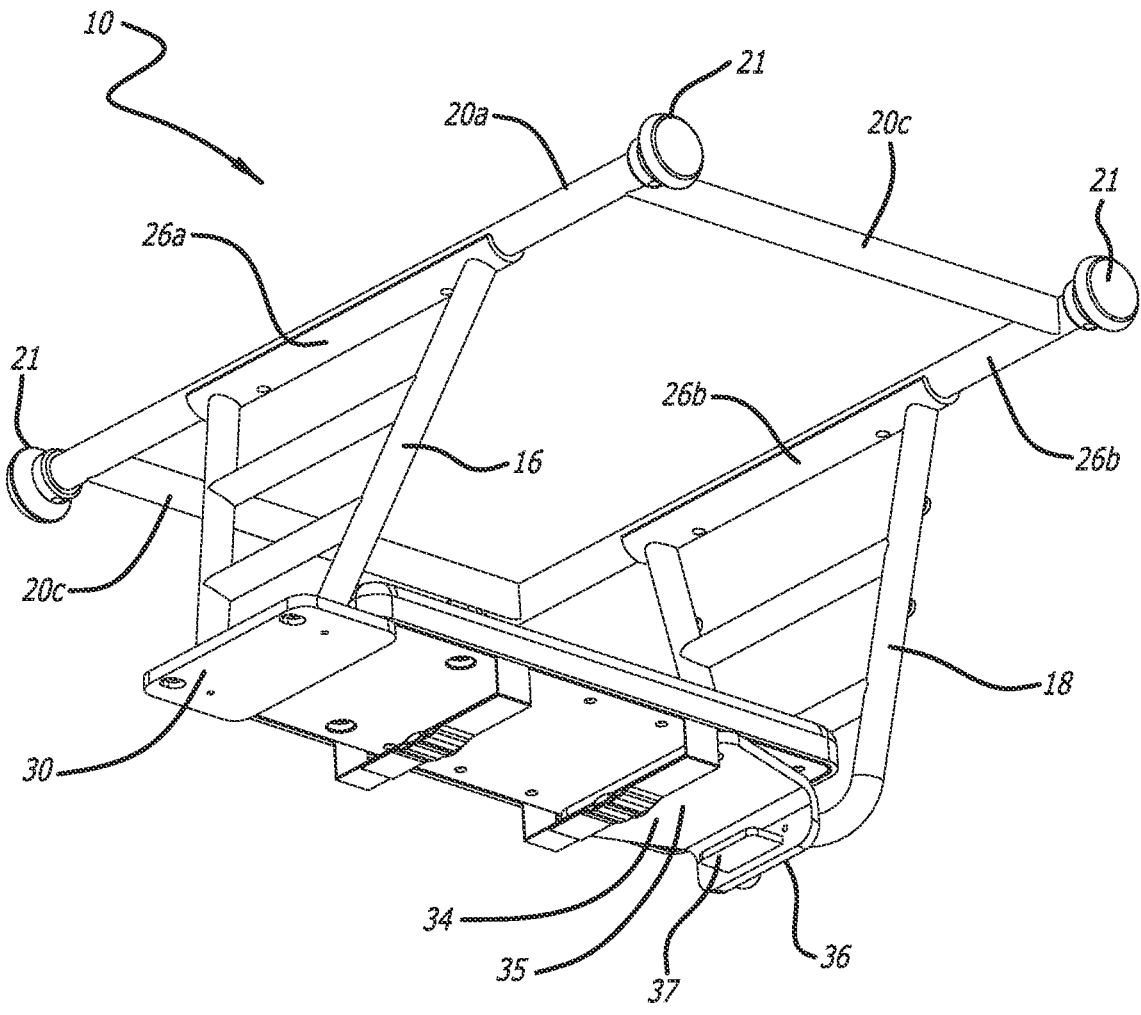
FIG. 11 is a bottom perspective view of the cargo holder of FIG. 10, according to the present disclosure.

In one embodiment, the hoop 20 is made of tubular aluminum material, although other materials such as metal, plastic, wood, etc., whether in tubular, solid, square, etc. form will work as the hoop 20. Additionally, in one embodiment, as shown in FIGS. 1-5, the hoop 20 is trapezoidal in shape, however, it may be any other shape acceptable to provide the desired function, such as rectangular (as shown in FIGS. 10 and 11), square, round or another shape. The receivers 26a, 26b support the hoop 20. The hoop 20 may be fixedly or removably secured to the receivers 26a, 26b. In one embodiment, the hoop 20 has apertures 39 and the receivers 26a, 26b have mating apertures such that bolts can be fitted therethrough and secured with nuts to secure the hoop 20 to the receivers 26a, 26b of the first and second frame assemblies 16, 18. As shown in FIG. 10, the hoop 20 may have a front member 20a, a rear member 20b, and two side members 20c. Accordingly, the front member 20a of the hoop 20 may be secured to the first receiver 26a of the first frame assembly 16, and the rear member 20b of the hoop 20 may be secured to the second receiver 26b of the second frame assembly 18. The hoop 20 may also have extensions 21 to provide additional clearance between the side members 20c and the ground should the bicycle 24 and cargo holder 10 fall to protect the person(s) in the cargo holder 10.

Figure 7:
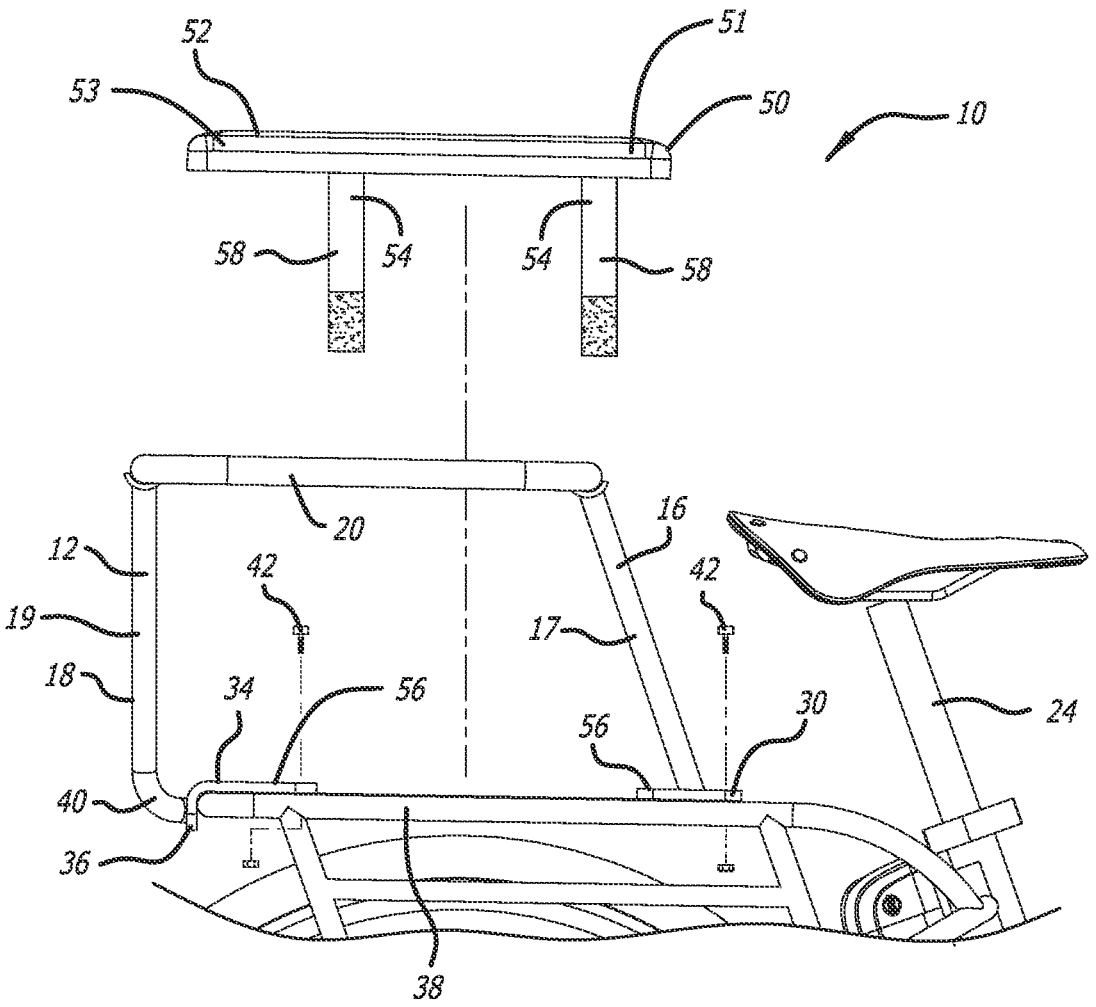
FIG. 7 is a side view of the cargo holder of FIG. 6, with the seat removed, according to the present disclosure.
Figure 8:
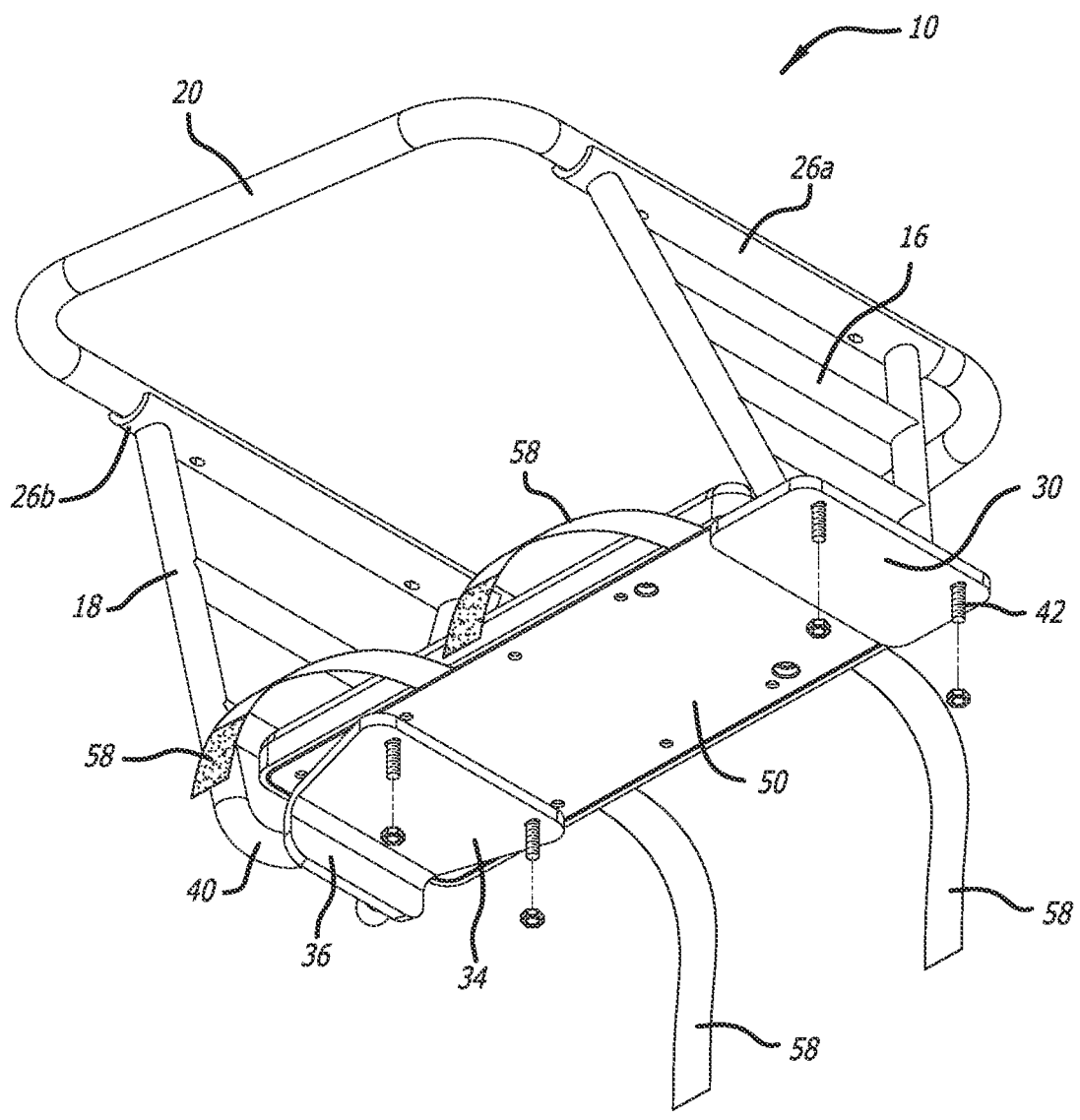
FIG. 8 is a bottom perspective view of the cargo holder of FIG. 6, removed from the bicycle frame, according to the present disclosure.
Figure 9:
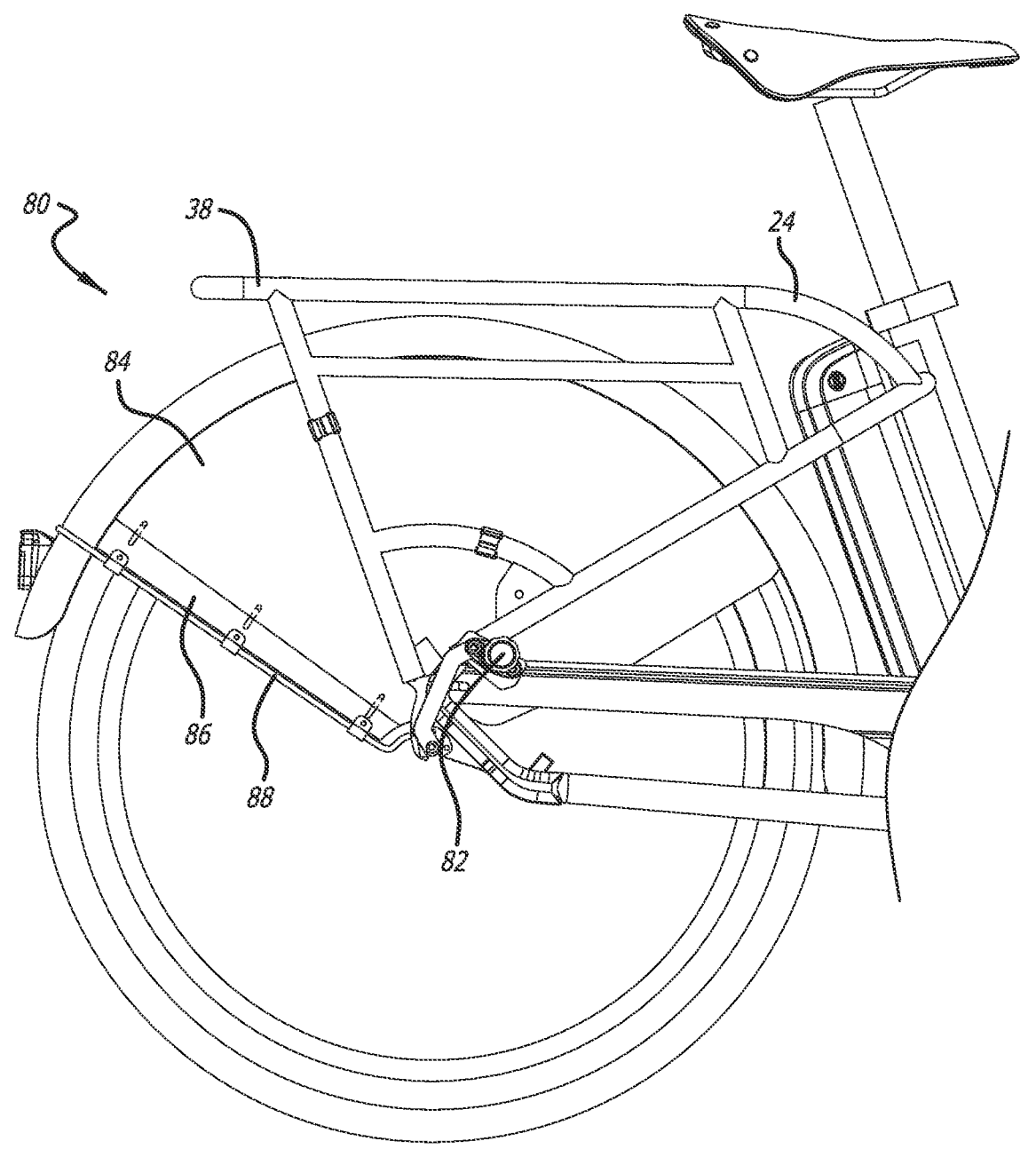
FIG. 9 is a side view of the shield and foot peg for a cargo holder, according to the present disclosure.

In one embodiment, the first frame assembly 16 has a first bracket 30 at the second end 32 thereof, and the second frame assembly 18 has a second bracket 34 at the second end 32 thereof. The brackets 30, 34 are secured to the bicycle 24 to secure the frame 12 to the bicycle 24, preferably removably, such as with the use of bolts and nuts. As shown in FIGS. 6-8, in one embodiment, the first and second brackets 30, 34 comprise a plate that is preferably welded to the first and second end members 17, 19, respectively. In one embodiment, the first bracket 30 is generally planar, while the second bracket 34 has a planar portion 35 and a flange portion 36 that extends downwardly and which may operate as a stop against the bicycle frame 38. Alternately, second bracket 34 may be entirely planar as well. Additionally, in one embodiment, as shown in FIG. 11, the second bracket 34 may have a planar portion 35 and a flange portion 36 that extends downwardly and which may operate as a stop against the bicycle frame 38, as well as a secondary planar portion 37 that extends from the flange portion 36. In one embodiment the secondary planar portion 37 is substantially parallel with the planar portion 35 and operates to provide further support for the frame 12 against the bicycle frame 38.

As best shown in FIGS. 6 and 7, in one embodiment the second end member 19 is generally vertical, whereas the first end member 17 extends at an angle away from the second end member 19, or put another way, at a transverse angle to the hoop 20. Additionally, in one embodiment, the hoop 20 is secured to the first frame assembly 16 and the second frame assembly 18.

In one embodiment, the second end member 19 may have a tangential feature 40 that extends at an angle to connect the second end member 19 with the second bracket 34. In one embodiment, the tangential feature 40 is welded to the flange portion 36 of the second bracket 34. First and second brackets 30, 34 may also have fasteners 42, such as a threaded member 42 as shown in FIG. 8, to allow the frame 12 to be removably secured to the bicycle frame 38 with the use of nuts. Alternately, the fasteners 42 may be apertures that allow a bolt to go therethrough to secure the frame 12 to the bicycle 24.

In one embodiment, a generally flat seat 50 may be removably secured to one or both of the frame 12 of the cargo holder 10 or the bicycle frame 38. In one embodiment, as shown in FIGS. 5-8, the seat 50 has a first end 51 and a second end 53. The seat 50 may also have a cushion component 52 and a securing device 54. The seat 50 may rest on the top surface 56 of the brackets 30, 34 of the cargo holder frame 12 as shown in FIGS. 6-8. Accordingly, when the seat 50 is secured to one of the frame 12 or the bicycle 24, the first end 51 of the seat 50 engages the first frame assembly 16 and the second end 53 of the seat 50 engages the second frame assembly 18. And, in one embodiment, the securing device 54 comprises one or more straps 58 to secure the seat 50 to the bicycle frame 38 or the frame 12. Accordingly, the seat 50 may be attached and removed from the cargo holder 10 quickly and easily.

Turning to the cargo liner 14, as shown in FIG. 3, in one embodiment the cargo liner 14 comprises a housing 60 having a front wall 62a, a rear wall 62b, opposing side walls 62c joining the front wall 62a and rear wall 62b at each side thereof, and a bottom wall 64 secured to the front wall 62a, rear wall 62b and opposing side walls 62c to form a cavity 66 therebetween. In one embodiment, the cargo liner 14 is soft sided and made of a fabric material. The cavity 66 of the liner 14 is utilized for storing cargo and other items the user may want to transport in the cargo holder 10. The liner 14 is removably secured to the cargo holder frame 12, including via fasteners 68. In one embodiment, the cargo liner 14 is removably secured to the hoop 20.

In one embodiment, fasteners 68 are provide adjacent each wall 62a, 62b, 62c of the cargo liner 14 to secure the cargo liner 14 to the hoop 20. For example, at the front sidewall 62a buttons, snaps or Velcro fasteners 68a are used to secure the liner 14 adjacent the front sidewall 62a to the frame 12 (typically by having an extension 70 of the sidewall 62 of the liner 14 placed over the top of the hoop 20 and then secured around the hoop 20 to that respective sidewall 62 via mating fasteners 68). At the two opposing side sidewalls 62b, buckles or clips 68b are used to secure the liner 14 adjacent the side sidewalls 62b thereof to the frame 12 in a similar manner. And, in one embodiment, at the rear sidewall 62c, fasteners 68c, such as buttons, snaps, or Velcro fasteners 68c are similarly used to secure the liner 14 adjacent the rear sidewall 62c to the frame 12 in a similar manner. In use, any type of fastener 68 may be provided at any wall, and not every wall needs fasteners.

The cargo liner 14 is thus removable from the cargo holder frame 12 and able to convert from a first mode, referred to as cargo mode or storage mode (shown in FIG. 3), to a second mode, referred to as kid transport mode or child ride mode (shown in FIGS. 1 and 4). To convert from cargo mode to child ride mode the cargo liner 14 is removed from the frame 12 by disconnecting all fasteners 68 and pulling the liner 14 from the frame 12.

In one embodiment, as shown in FIG. 3, the cargo liner 14 has a pouch 74. The pouch 74 is secured to the cargo liner 14, preferably at one of the front wall 62*a*, rear wall 62*b* opposing side walls 62*c* or bottom wall 64. The pouch 74 has an interior that may hold fasteners 76. Additionally, the pouch 74 can be inverted to create a receptacle 75 for retaining the liner 14. Specifically, the liner 14 may be disconnected from the frame 12, including the hoop 20, and stuffed into the receptacle 75 of the inverted pouch 74 as shown in FIGS. 4 and 5. When the pouch 74 is inverted, several fasteners 76 that previously resided inside the pouch 74 become visible on the outside after inversion and operate to secure the inverted and stuffed pouch 74 to the cargo frame 12 in child ride mode as shown in FIGS. 4 and 5. In this orientation, the pouch 74 with the liner 14 stuffed therein operates as a backrest 78 for a child sitting on the seat 50 of the cargo holder 10.

In another embodiment, the cargo holder 10 also comprises a shield assembly 80 and a foot peg assembly 82. The shield assembly 80 is provided on both sides of the rear wheel of the bicycle to shield the rear wheel of the bicycle 24 from the legs of a rider in the cargo holder 10. And, the foot peg assembly 82 similarly provides separate foot pegs 82 on both sides of the bicycle frame 38 such that the rider in the cargo holder 10 can place their feet on the foot pegs 82.

In one embodiment, the shield assembly 80 comprises two shield components 84 and 86 per side. The first shield component 84 is connected to brackets connected to the fender of the bicycle 24 and is preferably fixed in place. The second shield component 86 is connected to a shield frame 88 at one end, and to the first shield component 84 at a second location. To accommodate different mounting locations and different size wheels, the second shield component 86 fans with respect to the first shield component 84 to allow for adjustable mounting locations.

The embodiments detailed hereinabove may be combined in full or in part, with any alternative embodiments described.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the present disclosure may be embodied in other specific forms without departing from the spirit or central characteristics thereof. The present examples and embodiments, therefore, are to be considered in all respects as illustrative and not restrictive, and the Claims are not to be limited to the details given herein. Accordingly, while the specific embodiments have been illustrated and described, numerous modifications come to mind without significantly departing from the spirit of the disclosure and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A convertible cargo holder that is secured to a bicycle, comprising:
   a frame having a first frame assembly, a second frame assembly and a hoop, wherein the first frame assembly has a first receiver at a first end and a first bracket at a second end, wherein the second frame assembly has a second receiver at a first end and a second bracket at a second end, wherein the hoop is secured to the first receiver of the first frame assembly and the second receiver of the second frame assembly, and wherein the first bracket of the first frame assembly is secured to the bicycle and the second bracket of the second frame assembly is secured to the bicycle to secure the frame to the bicycle;
   a seat having a first end and a second end, wherein the seat is removably secured to one of the frame and the bicycle;
   a cargo liner having a front wall, a rear wall, opposing side walls joining the front wall and the rear wall, and a bottom wall secured to the front wall, rear wall and opposing sidewalls to form a cavity, the cargo liner being secured to the hoop, and wherein the cargo liner has fasteners adjacent the front wall, rear wall and opposing sidewalls thereof, to secure the cargo liner to the hoop; and,
   a pouch secured to one of the front wall, rear wall, opposing side walls, and bottom wall of the cargo liner, the pouch having a receptacle, wherein the cargo liner can be disconnected from the hoop and inserted into the receptacle of the pouch, wherein the pouch has securing members, and wherein the pouch with the cargo liner therein can be secured to the frame with the securing members and operate as a backrest.

2. The convertible cargo holder of claim 1, wherein the pouch is inverted to create the receptacle.

3. The convertible cargo holder of claim 1, wherein the securing members are provided outside the receptacle when the cargo liner is located within the receptacle.

4. The convertible cargo holder of claim 1, wherein the seat has a securing device to removably secure the seat to one of the frame and the bicycle.

5. The convertible cargo holder of claim 1, wherein the hoop has a front member, a rear member, and two side members.

6. The convertible cargo holder of claim 5, wherein the front member of the hoop is secured to the first receiver of the first frame assembly, and wherein the rear member of the hoop is secured to the second receiver of the second frame assembly.

7. The convertible cargo holder of claim 1, wherein the cargo liner is soft-sided and made of a fabric material.

8. The convertible cargo holder of claim 1, wherein the second bracket of the second frame assembly has a planar portion and a flange portion that extends downwardly therefrom to operate as a stop.

9. The convertible cargo holder of claim 8, further comprising a secondary planar portion extending from the flange portion, the secondary planar portion being substantially parallel with the planar portion.

10. The convertible cargo holder of claim 1, wherein the second frame assembly has a second end member that joins the second receiver and the second bracket, and wherein the first frame assembly has a first end member that joins the first receiver and the first bracket, the first end member being at a transverse angle to the hoop.

11. A convertible cargo holder that is secured to a bicycle, comprising:
   a frame secured to the bicycle, the frame having a hoop;
   a cargo liner having a front wall, a rear wall, opposing side walls joining the front wall and the rear wall, and a bottom wall secured to the front wall, rear wall and opposing sidewalls to form a cavity, the cargo liner being secured to the hoop, and wherein the cargo liner has fasteners adjacent the front wall, rear wall and opposing sidewalls thereof, to secure the cargo liner to the hoop; and,
   a pouch secured to one of the front wall, rear wall, opposing side walls, and bottom wall of the cargo liner, the pouch having a receptacle, wherein the cargo liner can be disconnected from the hoop and inserted into the receptacle of the pouch, wherein the pouch has securing members, and wherein the pouch with the cargo liner therein can be secured to the frame with the securing members.

12. The convertible cargo holder of claim 11, further comprising a seat having a first end and a second end, wherein the seat is removably secured to one of the frame and the bicycle.

13. The convertible cargo holder of claim 11, wherein the cargo liner is secured to the hoop adjacent the front wall, rear wall and opposing sidewalls thereof.

14. The convertible cargo holder of claim 11, wherein the frame also has a first frame assembly and a second frame assembly, wherein the first frame assembly has a first receiver at a first end and a first bracket at a second end, wherein the second frame assembly has a second receiver at a first end and a second bracket at a second end, wherein the hoop is secured to the first receiver of the first frame assembly and the second receiver of the second frame assembly, and wherein the first bracket of the first frame assembly is secured to the bicycle and the second bracket of the second frame assembly is secured to the bicycle to secure the frame to the bicycle.

15. The convertible cargo holder of claim 11, wherein the pouch is inverted to create the receptacle, and wherein the securing members are provided outside the receptacle when the cargo liner is located within the receptacle.

16. A convertible cargo holder that is secured to a bicycle, comprising:

a frame secured to the bicycle, the frame having a hoop;

a seat removably engaging the frame;

a cargo liner connected to the hoop, wherein the cargo liner has fasteners adjacent a front wall, a rear wall and opposing sidewalls thereof, to connect the cargo liner to the hoop; and, a pouch secured to the cargo liner, wherein the cargo liner can be disconnected from the hoop and inserted into the pouch.

17. The convertible cargo holder of claim 16, wherein the frame also has a first frame assembly and a second frame assembly, wherein the first frame assembly has a first receiver at a first end and a first bracket at a second end, wherein the second frame assembly has a second receiver at a first end and a second bracket at a second end, wherein the hoop is secured to the first receiver of the first frame assembly and the second receiver of the second frame assembly, and wherein the first bracket of the first frame assembly is secured to the bicycle and the second bracket of the second frame assembly is secured to the bicycle to secure the frame to the bicycle.

18. The convertible cargo holder of claim 16, wherein the cargo liner has a front wall, a rear wall, opposing side walls joining the front wall and the rear wall, and a bottom wall secured to the front wall, rear wall and opposing sidewalls to form a cavity.

19. The convertible cargo holder of claim 18, wherein the pouch is secured to one of the front wall, rear wall, opposing side walls, and bottom wall of the cargo liner, the pouch having a receptacle, wherein the cargo liner can be disconnected from the hoop and inserted into the receptacle of the pouch, wherein the pouch has securing members, and wherein the pouch with the cargo liner therein can be secured to the frame with the securing members and operate as a backrest.

* * * * *